Nov. 27, 1923.　　　　　　　　　　　　　　　　　　1,475,365
　　　　　　　J. L. SCHUELER ET AL
　　　　APPARATUS FOR MEASURING HIGH TEMPERATURES
　　　　　　　Filed Feb. 9. 1920　　　3 Sheets-Sheet 3
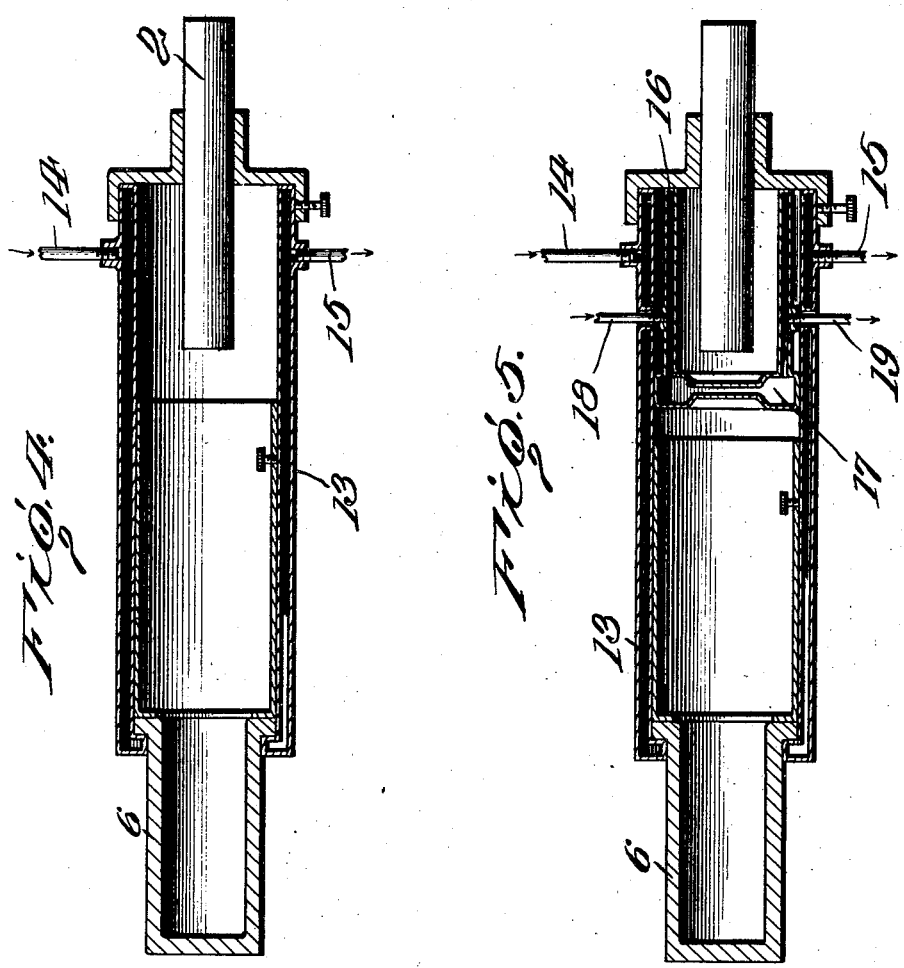

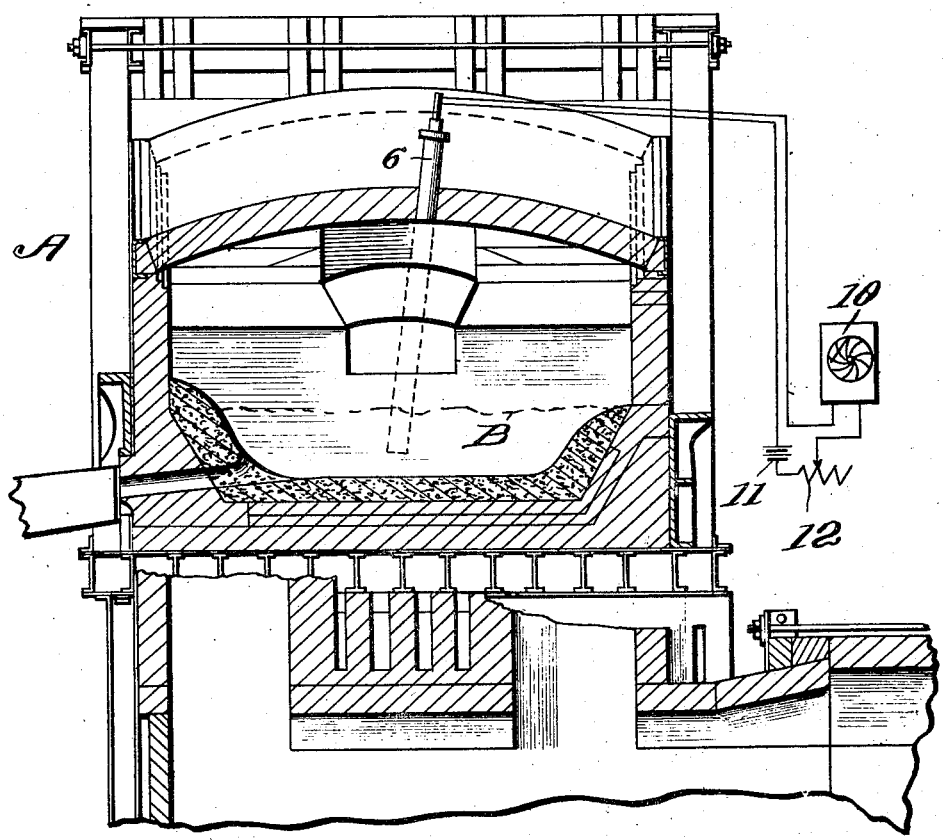

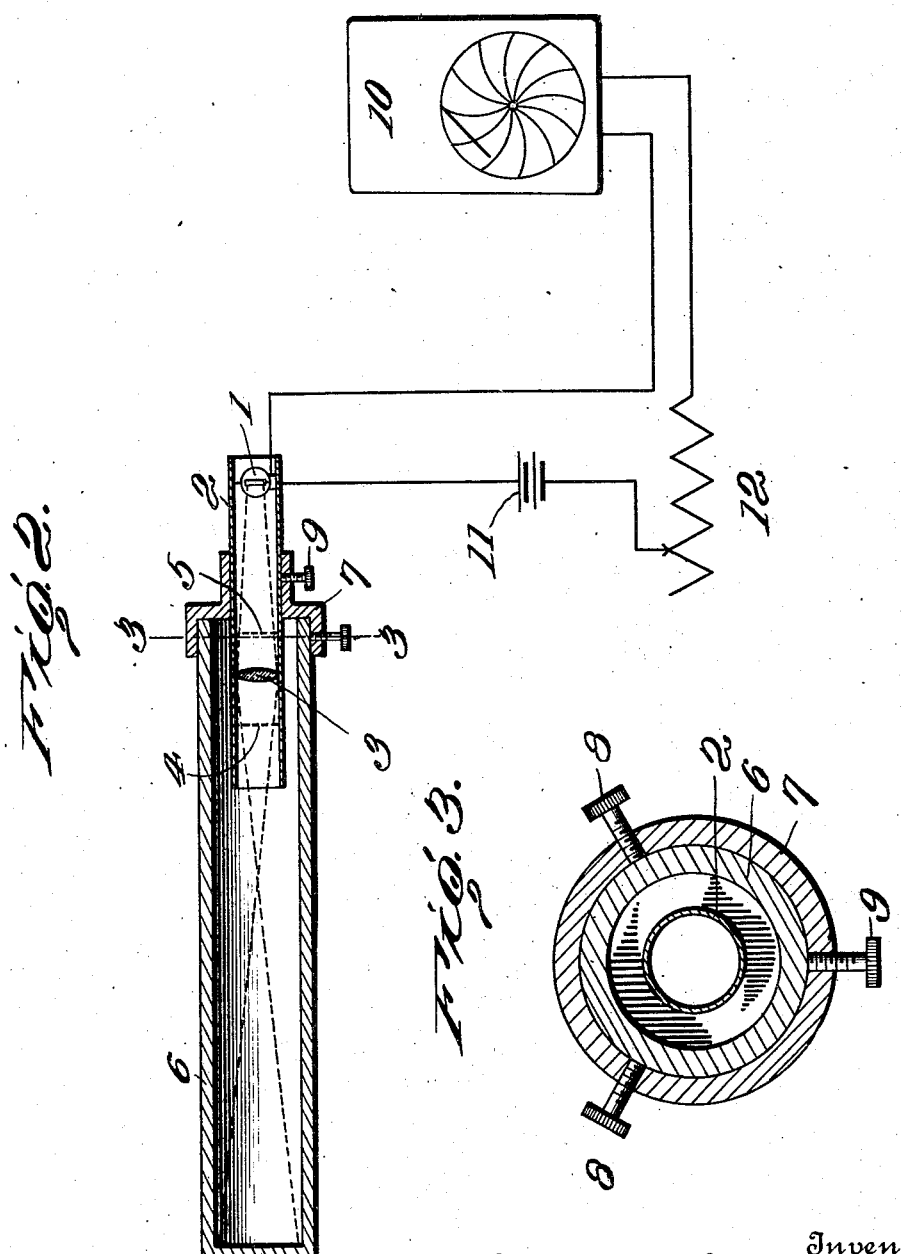

Patented Nov. 27, 1923.

1,475,365

UNITED STATES PATENT OFFICE.

JULIAN L. SCHUELER AND CHESTER A. KELLOGG, OF BARTONVILLE, ILLINOIS.

APPARATUS FOR MEASURING HIGH TEMPERATURES.

Application filed February 9, 1920. Serial No. 357,202.

*To all whom it may concern:*

Be it known that we, JULIAN L. SCHUELER and CHESTER A. KELLOGG, both citizens of the United States, residing at Bartonville, in the county of Peoria and State of Illinois, have invented new and useful Improved Apparatus for Measuring High Temperatures, of which the following is a specification.

This invention has reference to an apparatus for measuring high temperatures.

The invention has for its principal object to provide for the measuring of high temperatures, and especially in the metallurgical field where it is desirable to measure the temperatures of furnaces, molten metals, and for such other uses as may come within the scope of the use of a device designed to record or indicate, or both, temperatures exceeding approximately 1800 degrees Fahr.

The invention has for a further object to provide for the measuring of high temperatures, and contemplates the use of a light sensitive medium such as a selenium cell associated with a body capable when subjected to high temperatures of changing the color of said body, the intensity of which is focused, or reflected upon the said light sensitive medium or selenium cell, and by means of a suitable instrument electrically connected to said medium or cell recording of indicating the change in the resistance of the medium or cell, due to the action of the light emanating from said body when the same is subjected to the action of the heat.

The invention has for a further object to provide an apparatus for measuring high temperatures and includes a selenium cell associated preferably with a body of refractory material, which is adapted to be subjected to the application of severe heats, such as open hearth furnaces, and other metallurgical apparatus and glass furnaces involving the use of high temperatures, to flame, or to corrosive gases and the like, the change in intensity of the color of said refractory body effecting the resistance of said cell the change in which is transmitted to a suitable recording, or indicating instrument. The electrical source of the cell preferably includes batteries, connected if desired, with a potentiometer for the purpose of keeping the voltage from the batteries to the selenium cell, constant.

The invention contemplates further that the selenium cell may be associated with a body adapted to be subjected to high temperatures; with a lens focusing the light from the heated body to the selenium cell; color screen or screens placed either between the body to be heated and the lens, or between the lens and the selenium cell for the purpose of furnishing monochromatic light, and in the use of water cooling means for the purpose of protecting substantially all of that part of the apparatus with the exception of the body or portion thereof intended to be subjected to the high temperatures.

That the invention may be more fully understood reference is had to the accompanying drawings forming part of this description, and which shows a preferred embodiment of the invention, wherein, Fig. 1 is a vertical cross-section thru the body of an open hearth furnace and showing the application of our invention for the purpose of measuring the temperature of the roof of the furnace and also the molten metal in the furnace.

Fig. 2 is a longitidinal sectional view showing our apparatus which includes the selenium cell carried preferably within a tube containing a lens and associated with a refractory body and also showing in a diagrammatic manner a recording, or indicating instrument electrically connected with the cell and using batteries and a potentiometer;

Fig. 3 is an enlarged cross-section as the same would appear if taken on line 3—3 Fig. 2.

Fig. 4 is a longitudinal sectional view of an apparatus which includes the tube containing the selenium cell, a short refractory body and means for water-cooling that part of the apparatus, the temperature of which is not being measured, but which at the same time is subjected to the action of severe heat; and, Fig. 5 is a view similar to that shown in Fig. 4, and in which the apparatus includes a water-cooled lens located in the apparatus between the body to be subjected to the heat and the tube containing the selenium cell.

Like characters of reference denote corresponding parts thruout the figures.

Before proceeding with a description of our apparatus for measuring high temperatures, we wish to call attention to methods and apparatuses which have come to our attention used for measuring temperatures, but which are inadequate and unsatisfactory for the purpose of measuring the high temperatures of furnaces and molten metals, a field of use for which the present invention is particularly adapted. We have in mind particularly the following three methods and apparatuses:

First: Thermo-couples.
Second: Radiation of heat. (Radiation type.)
Third: Comparison of heat color with standard light of some kind. (Optical type.)

Referring to the use of thermo-couples for measuring temperatures two types are known. One of the base metal, and the other the precious metal. The base metal type of thermo-couples is only suitable for measuring temperatures below 2000 degrees Fahr., while the precious metal type of thermo-couples cannot be used for temperatures exceeding 2700 degrees Fahr., are expensive and only suitable for certain usage.

The radiation type for measuring high temperatures is unwieldy, requiring experienced operators and its uses are limited.

The optical type for measuring temperatures is limited to black body temperatures and must be calibrated for different molten metals due to different rates of emission of light from molten metal surfaces. This method of measuring high temperatures cannot be used for measuring flame temperatures nor for sighting thru a foggy medium such as smoke or steam. It is the object of our invention to eliminate all of the disadvantages due to the use of the methods of measuring high temperatures, such as thermo-couples, the radiation type and the optical type, and to eliminate the personal error where operators are required, by doing away with the necessity of the use of an operator and introducing an automatic instrument of recording, or indicating.

In the drawings, to be hereinafter more fully described, we illustrate the use of the invention for measuring the temperatures of an open hearth furnace, and also for measuring the temperature of the molten metal in the furnace. At the present time, so far as we are aware, there is no suitable method for obtaining the exact temperatures of molten steel while the steel is in the furnace. The accepted method in use today in steel mills is to remove the steel from the furnace in a spoon and then take an optical reading of the temperature of the metal. This process requires the services of two men, and inasmuch as the steel cools rapidly in the spoon, an accurate measurement of the temperature of the steel in the furnace is not obtained. This last mentioned process of measuring temperatures of high temperature molten metals must be carried out in connection with the testing of metals from any high temperature molten metal furnace, particularly where the metal in the furnace is covered with slag. With the use of our invention operators are not limited by the temperature of permanent high temperature furnaces, because, as will more fully appear, that part of our apparatus which is exposed to the heat, whether it be the heat of the roof of the furnace, or the molten metal therein, is made of a suitable refractory material, and included in the method or apparatus is a measuring instrument by which the direct temperature may be obtained and recorded continuously for any period of time without the use of an operator, and without the necessity of removing the molten metal from the furnace, in the manner we have last previously explained.

The apparatus employed for measuring high temperatures comprises a selenium cell or other light sensitive medium 1, which is suitably mounted within a preferably elongated tube 2. This tube is preferably made of metal, altho it may be made of other suitable material as experience may demand, or the occasion require. At some suitable point in the tube 2 and between the selenium cell and the opposite open end of the tube is located a suitable lens 3, and if desirable for the purpose of furnishing monochromatic light, a color screen 4 may be placed in the tube between the open end thereof and the lens 3, or a color screen 5 may be located in the tube between the lens 3. and the selenium cell 1, or both may be used as shown if proven desirable.

The tube 2 with the selenium cell 1 and lens and color screens may constitute one of the unitary elements of the apparatus and the same is adapted to be adjustably connected with a body 6. This body is preferably shown in the form of an elongated cylindrical member closed at one end and made preferably of refractory material. One end of this body 6 is closed by a reducing coupling 7 adjustable concentrically on the end of the body by means of the set-screws 8 which secure the reducing coupling on the body 6. It is thru this reducing coupling that the tube 2 is adjustable longitudinally in the said body 6, and the same secured in adjusted positions by means of the set screw 9. The body 6 with the reducing coupling forms the other unitary member of the apparatus and may be retained in the assembled relation shown, or detached for any purpose when desired. It is to be understood that the body 6 may vary in length when intended for different uses. For instance, in Fig. 1 we have shown this body of two different lengths. In full lines it conforms substantially to the length of the body 6 shown in Fig. 2 and being used for measuring the temperature of the roof of an open hearth furnace A and in dotted lines the body 6 is shown much longer in length to adapt its use when inserted thru the roof of the furnace, or thru any other wall thereof to the purpose of measuring the temperature of the molten metal B within the furnace.

10 designates what may be regarded as a recording, or indicating instrument, such as a galvanometer. This instrument 10 is shown connected in a diagrammatic way electrically with the selenium cell 1. We have chosen to show the electrical connections comprising a battery, or batteries 11, preferably in series as shown, and a potentiometer 12, which is used for the purpose of controlling the voltage flowing from the source of electricity thru the selenium cell 1.

In operation, when the body 6 is inserted into the furnace A, as shown in Fig. 1, said body will become heated, and as the temperature of the body rises the light due to that temperature becomes greater and such light is focused on the selenium cell 1 preferably by means of the lens 3 and thru the color screens 4 if desired. The selenium cell connected with the recording, or indicating instrument 10 said instrument will record or indicate any variation in resistance of the selenium cell 1 due to the effect of the increasing light emitted from the body 6 which is being subjected to heat. By adjusting the tube 2 longitudinally in the body 6, or by adjusting the lens 3 within the tube 2 we can focus the light from any area on the surface of the body 6 to the selenium cell 1 as will be understood. With the use of the equipment, such as we show, it is obvious that the instrument 10 may be located at any desirable point and electrically connected in a suitable manner with the selenium cell.

Referring to Fig. 4, we have here illustrated the body 6 as a very short length compared to the entire length of the apparatus and we have shown the body of the apparatus between the parts 6 and the tube 2 as a water jacketed tube 13. The water entering thru the pipe 14 circulating thru the tube and discharging thru the pipe 15. It is the function of this tube 13 to protect that part of the body which is being subjected to heat but which is not necessary for the measurement of the temperature. In Fig. 5, we have shown substantially the same water-cooled structure that we have shown in Fig. 4, and in addition thereto we have inserted a water jacketed tube 16 provided at one end with a hollow disc 17 the two plane parallel surfaces of which are of glass thru which water in the tube 16 circulates. This cylinder 17 is used for absorbing heat and to protect the tube 2 and selenium cell 1. Water enters the tube 16 thru the pipe 18 and discharging from said tube thru the pipe 19.

The advantage gained by using a color screen or screens, as above stated, is due to the fact that the refractory tube is closed at the end in contact with the flame or hot material and the inside of the tube functions at all times as a "black-body." Therefore by putting in a suitable color screen, or screens, the effective wave length of such screen, or screens is that wave length for which a small change in temperature of the "black-body" sighted upon produces the same fractional change in luminosity and in the energy intensity at this wave length as measured thru the screen. In other words, it is not the color per se which is being measured, but simply the brightness of uniform color.

What we claim is:—

1. In device for measuring high temperatures, in combination, a tubular body, a light sensitive cell in said body, a lens in said body, and means connected with said tubular body arranged to exclude light interfering media between said means and said cell and when subjected to heat changing in degree of intensity of color which change affects the resistance of said cell.

2. In a device for measuring high temperature, in combination, a tubular body, a light sensitive cell in said body, a lens in said body, means connected with said tubular body arranged to exclude light interfering media between said means and said cell and when subjected to heat changing in degree of intensity of color which affects the resistance of said cell, and a registering instrument electrically connected with said cell for registering the changes in resistance of said cell.

3. In a device for measuring high temperatures, in combination, a tubular body, a light sensitive cell in said body, a lens in said body, means connected with said tubular body arranged to exclude light interfering media between said means and said cell and when subjected to heat changing in degree of intensity of color which affects the resistance of said cell, and a color screen between said light excluding means and said cell.

4. In a device for measuring high temperatures, in combination, a tubular body, a light sensitive cell in said body, a lens in said body, means connected with said tubular body arranged to exclude light interfering media between said means and said cell and when subjected to heat changing in degree of intensity of color which affects the resistance of said cell, a color screen between said light excluding means and said cell, and a registering instrument electrically connected with said cell for registering the changes in resistance of said cell.

5. In a device for measuring high temperatures, in combination, a tubular body, a light sensitive cell in said body, a lens in said body spaced from said cell, and a closure of refractory material for said body.

6. In a device for measuring high temperatures, in combination, a tubular body, a light sensitive cell in said body, a lens in said body spaced from said cell, a closure of refractory material for said body, and a registering instrument electrically connected with said cell for registering the changes in resistance of said cell.

7. In a device for measuring high temperatures, in combination, a tubular body, a light sensitive cell in said body, a lens in said body spaced from said cell, a closure of refractory material for said body, a color screen between said closure and said cell, and a registering instrument electrically connected with said cell for registering the changes in resistance of said cell.

8. In a device for measuring high temperatures, in combination, a tubular body, a light sensitive cell in said body, a lens in said body, a closure of refractory material for said body, and a color screen between said closure and said light sensitive cell.

9. In a device for measuring high temperatures, in combination, a tubular body, a light sensitive cell in said body, a lens in said body, a refractory body adapted to be subjected to heat, and a water-cooled casing connecting said refractory body and said tubular body.

10. In a device for measuring high temperatures, in combination, a tubular body, a light sensitive cell in said body, a lens in said body, a refractory body adapted to be subjected to heat, and a registering instrument electrically connected with said cell for registering the changes in resistance of said cell.

11. In a device for measuring high temperatures, in combination, a tubular body, a light sensitive cell in said body, a lens in said body, a refractory body adapted to be subjected to heat, a color screen between said refractory body and said light sensitive cell, and a water-cooled casing connecting said refractory body and said tubular body.

12. In a device for measuring high temperatures, in combination, a tubular body, a light sensitive cell in said body, a lens in said body, a refractory body adapted to be subjected to heat, a color screen between said refractory body and said light sensitive cell, a water-cooled casing connecting said refractory body and said tubular body, and a registering instrument electrically connected with said cell for registering the changes in the resistance of said cell.

13. In a device for measuring high temperatures, in combination, a tubular body, a light sensitive cell in said body, a lens in said body, a refractory body adapted to be subjected to heat, a water-cooled casing connecting said refractory body with said tubular body and a transparent water-cooled heat absorbing screen between said refractory body and said tubular body.

14. In a device for measuring high temperatures, in combination, a tubular body, a light sensitive cell in said body, a lens in said body, a refractory body adapted to be subjected to heat, a water-cooled casing connecting said refractory body with said tubular body, a transparent water-cooled heat absorbing screen between said refractory body and said tubular body, and a registering instrument electrically connected with said cell for registering the changes in resistance of said cell.

15. In a device for measuring high temperatures, in combination, a tubular body, a light sensitive cell in said body, a lens in said body, a refractory body adapted to be subjected to heat, a color screen between said refractory body and said light sensitive cell, a water-cooled casing connecting said refractory body with said tubular body, a transparent water-cooled heat absorbing screen between said refractory body and said tubular body, and a registering instrument electrically connected with said cell for registering the changes in resistance of said cell.

16. In a device for measuring high temperatures, in combination, an elongated tubular body open at one end and a light sensitive cell in the end of said body removed from the open end, a lens in said body between its open end and said cell, one or more color screens in said body between the open end thereof and said cell, an elongated tubular body of refractory material closed at one end forming a closure for the open end of said cell containing body, and means for coupling the cell containing body to said body of refractory material.

17. In a device for measuring high temperatures, in combination, an elongated tubular body open at one end and a light sensitive cell in the end of said body removed from the open end, a lens in said body between its open end and said cell, one or more color screens in said body between the open end thereof and said cell, an elongated tubular body of refractory material closed at one end forming a closure for the open end of said cell containing body, means for coupling the cell containing body to said body of refractory material, and a registering instrument electrically connected with said cell for registering the changes in resistance of said cell.

JULIAN L. SCHUELER.
CHESTER A. KELLOGG.